United States Patent
Bai et al.

(10) Patent No.: US 12,199,256 B2
(45) Date of Patent: Jan. 14, 2025

(54) BATTERY PACK

(71) Applicant: CONTEMPORARY AMPEREX TECHNOLOGY (HONG KONG) LIMITED, Hong Kong (CN)

(72) Inventors: Xueyu Bai, Ningde (CN); Yanlong Gu, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 560 days.

(21) Appl. No.: 17/345,850

(22) Filed: Jun. 11, 2021

(65) Prior Publication Data

US 2021/0305642 A1    Sep. 30, 2021

Related U.S. Application Data

(63) Continuation of application No. PCT/CN2019/079673, filed on Mar. 26, 2019.

(30) Foreign Application Priority Data

Dec. 29, 2018  (CN) .......................... 201822246621.4

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/647* (2015.04); *H01M 50/209* (2021.01); *H01M 50/262* (2021.01)

(58) Field of Classification Search
CPC .......... H01M 10/6556; H01M 10/613; H01M 10/647; H01M 50/209
See application file for complete search history.

(56) References Cited

U.S. PATENT DOCUMENTS

2011/0189524 A1   8/2011  Alizon et al.
2019/0173064 A1*  6/2019  Lee .................... H01M 10/625

FOREIGN PATENT DOCUMENTS

CN     207217717 U    4/2018
CN     207282570 U    4/2018
(Continued)

OTHER PUBLICATIONS

State Intellectual Property Office of China Notice of Grant of Invention Patent Right for Application No. 201822246621.4 Jun. 6, 2019 2 pages (including translation).
(Continued)

*Primary Examiner* — Adam A Arciero
(74) *Attorney, Agent, or Firm* — ANOVA LAW GROUP, PLLC

(57) ABSTRACT

A battery pack according to this application includes a lower support; a lower fastening member that is fastened onto the lower support and extending upwards along a height direction; an upper support plate provided above the lower fastening member; and a heat exchange plate directly fastened onto the upper support plate. In the battery pack according to this application, the heat exchange plate is directly fastened onto the upper support plate, which eliminates use of a position locking piece to position the heat exchange plate and ensures that flatness and positioning tolerance of the heat exchange plate are not affected.

7 Claims, 5 Drawing Sheets

(51) Int. Cl.
H01M 10/647 (2014.01)
H01M 50/209 (2021.01)
H01M 50/262 (2021.01)

(56) References Cited

FOREIGN PATENT DOCUMENTS

| CN | 108028336 A | 5/2018 |
| CN | 108711596 A | 10/2018 |
| CN | 207967246 U | 10/2018 |

OTHER PUBLICATIONS

The European Patent Office (EPO) The Extended European Search Report for Application No. 19906414.8 Dec. 20, 2021 6 Pages.
The European Patent Office (EPO) Communication about intention to grant a European patent for Application No. 19906414.8 Aug. 3, 2022 5 Pages.
The World Intellectual Property Organization (WIPO) International Search Report and Written Opinion for PCT/CN2019/079673 Sep. 3, 2019 12 Pages (including translation).

* cited by examiner

BATTERY PACK

CROSS-REFERENCE TO RELATED APPLICATIONS

This application is a continuation application of PCT Patent Application No. PCT/CN2019/079673, entitled "BATTERY PACK" filed on Mar. 26, 2019, which claims priority to Chinese Patent Application No. 201822246621.4, filed on Dec. 29, 2018 and entitled "BATTERY PACK", all of which are incorporated herein by reference in their entirety.

TECHNICAL FIELD

This application relates to the battery field, and in particular, to a battery pack.

BACKGROUND

An upper heat exchange plate of a battery pack is usually positioned by using both a position locking piece and an upper support plate. However, the position locking piece is small in size and prone to skew during production, and is often deformed due to its insufficient strength in an assembly process. Consequently, flatness and positioning tolerance of the heat exchange plate are adversely affected, which in turn affects the heat exchange effect.

SUMMARY

In view of the problems described in Background, an objective of this application is to provide a battery pack in which a heat exchange plate can be directly fastened onto an upper support plate, so as to eliminate use of a position locking piece, and ensure that flatness and positioning tolerance of the heat exchange plate are not affected.

To achieve the foregoing objective, this application provides a battery pack. The battery pack includes a lower support; a lower fastening member that is fastened onto the lower support and extending upwards along a height direction; an upper support plate provided above the lower fastening member; and a heat exchange plate directly fastened onto the upper support plate.

In an embodiment, the heat exchange plate is mechanically fastened onto the upper support plate.

In an embodiment, the heat exchange plate is provided with a sinking platform, where the sinking platform is recessed downward from a side facing away from the upper support plate and protrudes towards the upper support plate, and the sinking platform is provided with a first hole running through the sinking platform in the height direction; the upper support plate is provided with a second hole running through the upper support plate in the height direction, where the second hole is aligned with the first hole; and the battery pack further includes a fastening member that passes through the first hole of the sinking platform and the second hole of the upper support plate to fasten the heat exchange plate onto the upper support plate.

In an embodiment, the fastening member does not protrude beyond an upper surface of the heat exchange plate.

In an embodiment, the heat exchange plate includes a first plate and a second plate, where the second plate is provided closer to the upper support plate than the first plate, the second plate is provided with a flow channel portion for forming a flow channel, the flow channel portion is recessed downward from a side facing the first plate and protrudes towards the other side, and the sinking platform protrudes downwards beyond a lowest position of the flow channel portion along the height direction.

In an embodiment, the sinking platform is formed by stamping together the first plate and the second plate.

In an embodiment, sinking platforms are provided at four corners of the heat exchange plate.

In an embodiment, the sinking platform is provided at a central region of the heat exchange plate.

In an embodiment, the battery pack further includes an upper battery module that is provided on the heat exchange plate and that is in thermally conductive contact with the heat exchange plate.

In an embodiment, the upper battery module is fastened to an upper surface of the heat exchange plate by a structural adhesive.

Beneficial effects of this application are as follows: In the battery pack according to this application, the heat exchange plate is directly fastened onto the upper support plate. This avoids use of a position locking piece to position the heat exchange plate, and ensures that flatness and positioning tolerance of the heat exchange plate are not affected.

Figure 1:
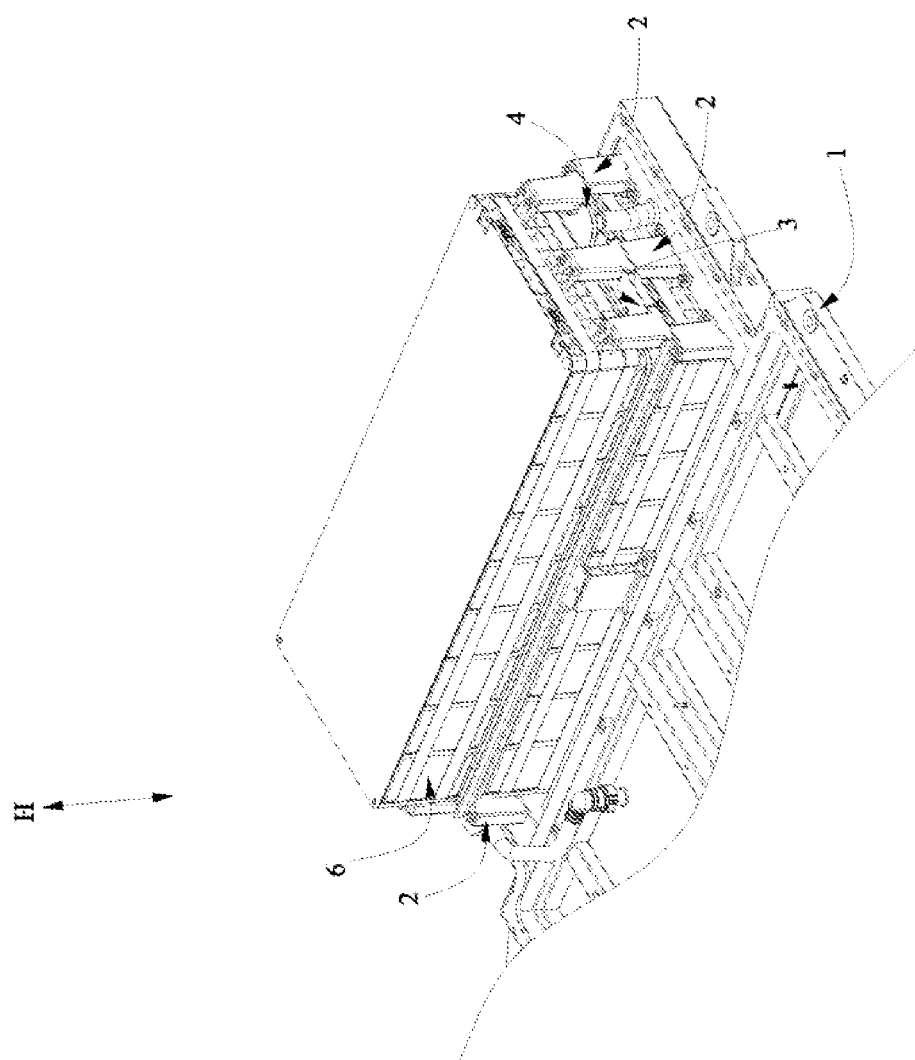
FIG. 1 is a partial perspective view of a battery pack according to this application.

Reference signs are described as follows:
1. lower support
2. lower fastening member
3. upper support plate
   31. second hole
4. heat exchange plate
   41. sinking platform
      411. first hole
   42. first plate
   43. second plate
      431. flow channel portion
   F. flow channel
5. fastener
6. upper battery module
H. height direction

DESCRIPTION OF EMBODIMENTS

The accompanying drawings show embodiments of this application. It should be understood that the disclosed embodiments are merely examples of this application and this application can be implemented in various forms. Therefore, specific details disclosed herein should not be construed as a limitation. Instead, they should serve only as a basis for the claims and as an illustrative basis to instruct persons of ordinary skill in the art to implement this application in various ways.

Additionally, expressions such as a length direction, a height direction, and a width direction that are used to indicate directions for operations and construction of components of a battery pack in the embodiments are not absolute but rather relative. Such indications are appropriate when these components of the battery pack are in the locations illustrated in the drawings; however, these directions should be interpreted differently when these locations change, in order to correspond to the changes.

Figure 2:
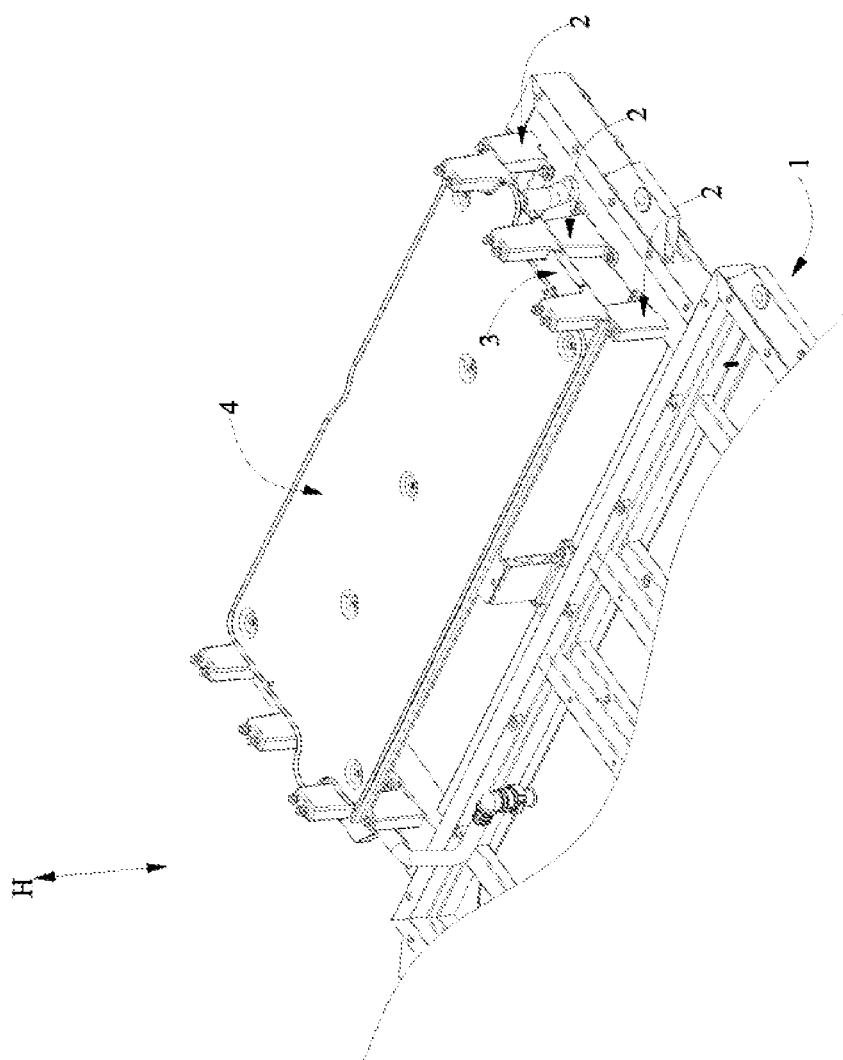
FIG. 2 is a perspective view of the battery pack in FIG. 1 without a battery module.

FIG. 1 is a partial perspective view of a battery pack according to this application. FIG. 2 is a perspective view of the battery pack in FIG. 1 without a battery module.

The battery pack according to this application includes a lower support 1; a lower fastening member 2 that is fastened onto the lower support 1 and extending upwards along a height direction H; an upper support plate 3 provided above the lower fastening member 2; and a heat exchange plate 4 directly fastened onto the upper support plate 3. The battery pack further includes an upper battery module 6 that is provided on the heat exchange plate 4 and that is in thermally conductive contact with the heat exchange plate 4. The upper battery module 6 is fastened to an upper surface of the heat exchange plate 4 by a structural adhesive.

The heat exchange plate 4 is directly fastened onto the upper support plate 3. This avoids use of a position locking piece, and ensures that flatness and positioning tolerance of the heat exchange plate 4 are not affected, thereby ensuring a heat exchange effect of the heat exchange plate 4. Preferably, the heat exchange plate 4 is mechanically fastened onto the upper support plate 3. When mechanical fastening is used, the battery pack further needs to include a fastener 5. The heat exchange plate 4 is fastened onto the upper support plate 3 through the fastener 5. The mechanical fastening ensures reliable connection between the heat exchange plate 4 and the upper support plate 3, and is simple to operate and convenient for mounting. A specific embodiment in which the heat exchange plate 4 is mechanically fastened onto the upper support plate 3 is detailed below.

Figure 3:
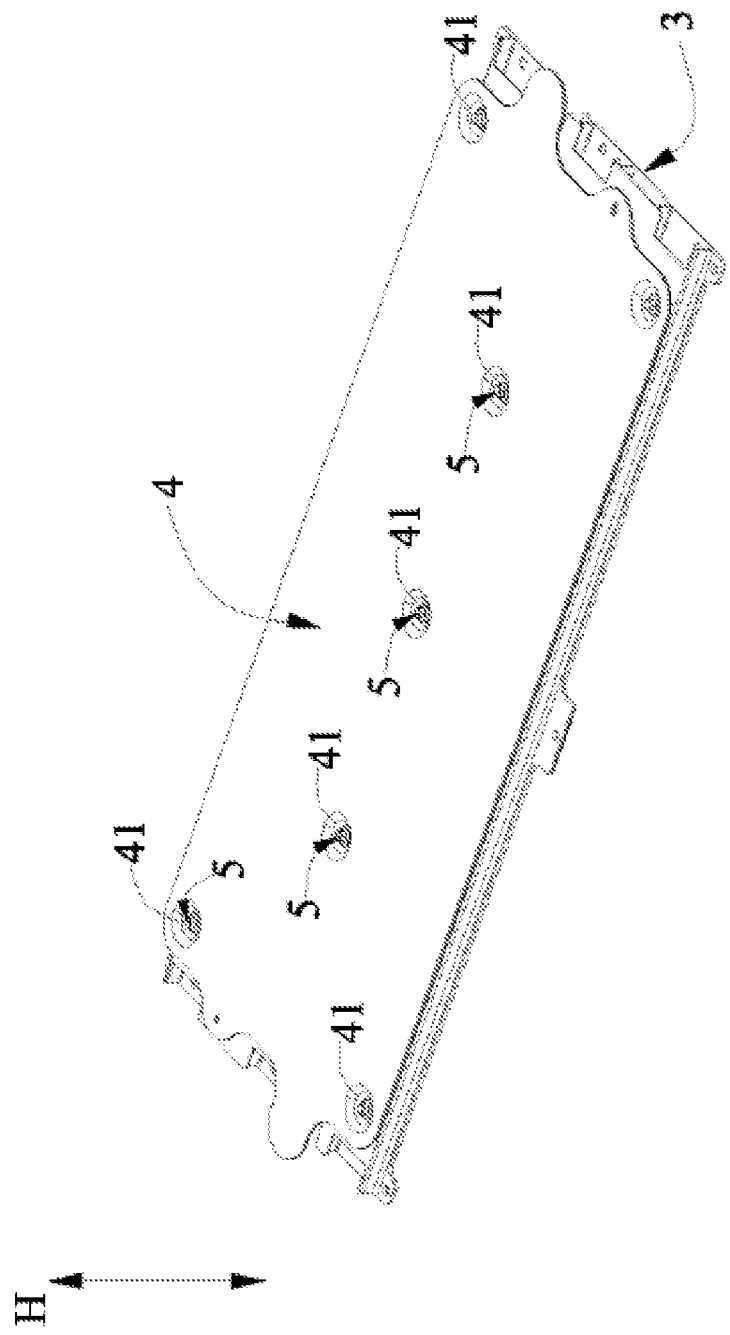
FIG. 3 is a perspective view of an upper support plate and a heat exchange plate in FIG. 2, where the heat exchange plate is shown in another embodiment.
Figure 4:
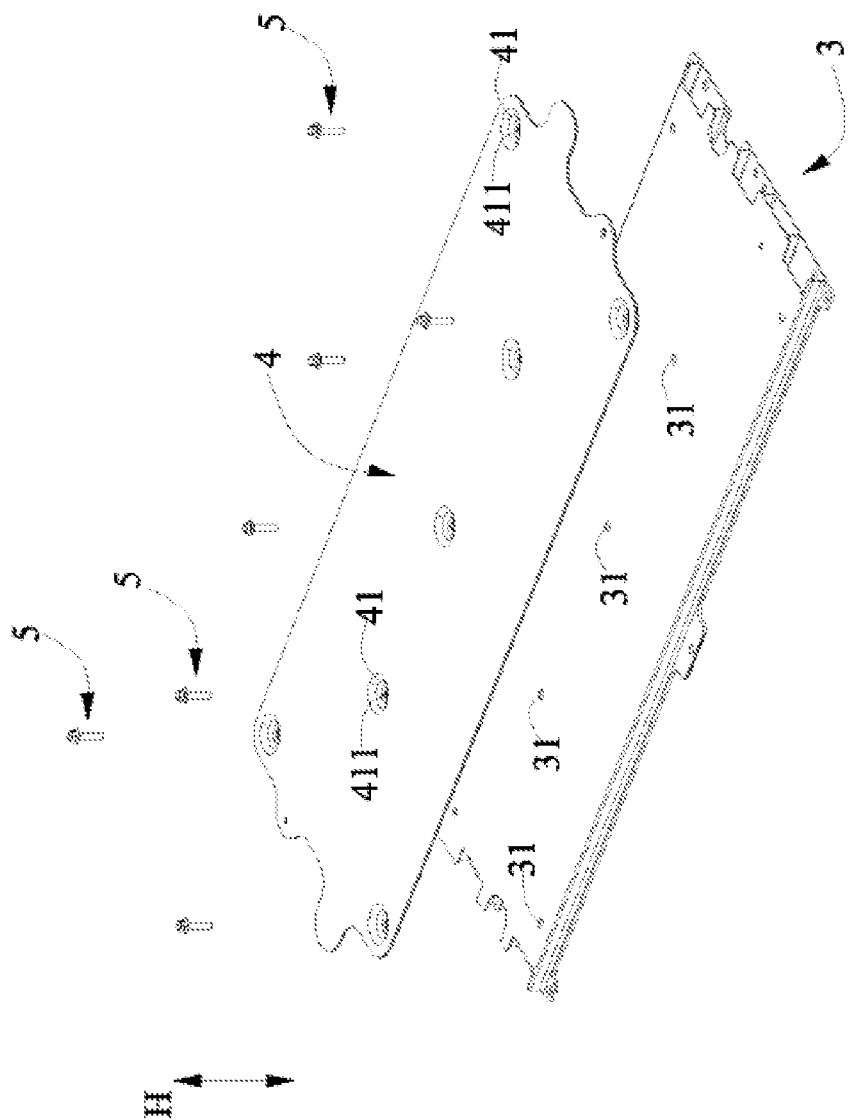
FIG. 4 is an exploded view of FIG. 3.
Figure 5:
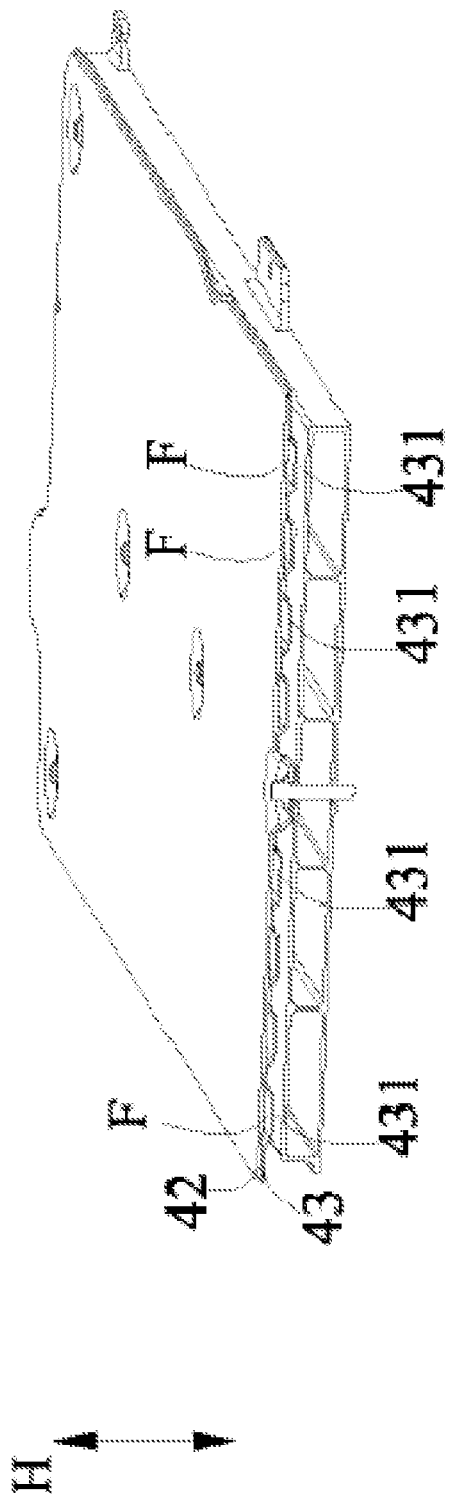
FIG. 5 is a sectional view of FIG. 3.

FIG. 3 is a perspective view of an upper support plate and a heat exchange plate in FIG. 2, where the heat exchange plate is shown in another embodiment. FIG. 4 is an exploded view of FIG. 3. FIG. 5 is a sectional view of FIG. 3.

The upper support plate 3 is provided with a second hole 31 running through the upper support plate in the height direction H.

The heat exchange plate 4 is provided with a sinking platform 41, and the sinking platform 41 is recessed downward from a side facing away from the upper support plate 3 and protrudes towards the upper support plate 3. The heat exchange plate 4 includes a first plate 42 and a second plate 43, and the second plate 43 is provided closer to the upper support plate 3 than the first plate 42. The sinking platform 41 is formed by stamping together the first plate 42 and the second plate 43.

Sinking platforms 41 are provided at four corners of the heat exchange plate 4. The heat exchange plate 4 is mechanically connected to the upper support plate 3 at the sinking platforms 41 at the four corners. This improves stability of the heat exchange plate 4. In addition, the upper battery module 6 is fastened to the heat exchange plate 4 by the structural adhesive, and provision of the sinking platforms 41 at the four corners can store excess structural adhesives. Therefore, this prevents the excess structural adhesives from overflowing to a region outside the battery module 6.

Certainly, the sinking platform 41 may also be provided at other positions. For example, the sinking platform 41 is provided at a central region of the heat exchange plate 4, to prevent the heat exchange plate 4 from deformation caused by suspension in the middle region.

The sinking platform 41 is provided with a first hole 411 running through the sinking platform in the height direction H, and the second hole 31 is aligned with the first hole 411.

The fastener 5 passes through the first hole 411 of the sinking platform 41 and the second hole 31 of the upper support plate 3 to fasten the heat exchange plate 4 onto the upper support plate 3.

The fastener 5 is preferably a screw. The fastener 5 mechanically connects the heat exchange plate 4 and the upper support plate 3, thereby improving the reliability of the connection between the two, and ensuring the flatness and the positioning tolerance of the heat exchange plate 4. In addition, the heat exchange plate 4 is made of a metal material, the upper support plate 3 is made of a metal material, the fastener 5 is made of a metal material, and the fastener 5 connects the heat exchange plate 4 and the upper support plate 3. This implements equipotential connection. Furthermore, the sinking platform 41 of the heat exchange plate 4 protrudes towards the upper support plate 3, and regions of the heat exchange plate 4 other than the sinking platform 41 are spaced apart from the upper support plate 3. This design greatly reduces a contact area between a bottom of the heat exchange plate 4 and the upper support plate 3, thereby reducing an amount of heat transferred from the heat exchange plate 4 to the upper support plate 3 and improving the heat exchange effect between the heat exchange plate 4 and the upper battery module 6. In addition, the sinking platform 41 is recessed downward to a specified depth to form a groove with an opening facing towards the upper battery module 6, so that the fastener 5 can be accommodated in the groove; and the fastener 5 does not protrude beyond an upper surface of the heat exchange plate 4, thereby avoiding that the fastener 5 scratches the upper battery module 6 in contact with the upper surface of the heat exchange plate 4. Certainly, the heat exchange plate 4 may alternatively not be mechanically fastened onto the upper support plate 3, that is, the heat exchange plate 4 may be welded and fastened to the upper support plate 3 at the sinking platform 41, or fastened onto the upper support plate 3 at the sinking platform 41 by a structural adhesive. A specific fastening form can be selected depending on a specific situation.

The second plate 43 is provided with a flow channel portion 431 for forming a flow channel F, the flow channel portion 431 is recessed downward from a side facing the first plate 42 and protrudes beyond the other side, and the sinking platform 41 protrudes downwards beyond a lowest position of the flow channel portion 431 along the height direction H. This ensures that the flow channel F of the heat exchange plate 4 is not compressed in the height direction H.

The foregoing detailed descriptions describe a plurality of exemplary embodiments. However, an expressly disclosed combination is not limited herein. Therefore, unless otherwise stated, various features disclosed herein may be combined together to form a plurality of other combinations that are not shown for simplicity purposes.

What is claimed is:

1. A battery pack, comprising:
   a lower support;
   a lower fastening member that is fastened onto the lower support and extending upwards along a height direction;
   an upper support plate provided above the lower fastening member; and
   a heat exchange plate directly fastened onto the upper support plate, and comprising a first plate, a second plate, and a sinking platform, wherein the second plate is provided closer to the upper support plate than the first plate, the second plate is provided with a flow channel portion for forming a flow channel, the flow channel portion is recessed downward from a side facing the first plate and protrudes beyond the other side, and the sinking platform protrudes downwards beyond a lowest position of the flow channel portion along the height direction.

2. The battery pack according to claim 1, wherein the heat exchange plate is mechanically fastened onto the upper support plate.

3. The battery pack according to claim 1, wherein the sinking platform is formed by stamping together the first plate and the second plate.

4. The battery pack according to claim 1, wherein
sinking platforms are provided at four corners of the heat exchange plate.

5. The battery pack according to claim 1, wherein the upper battery module is fastened to an upper surface of the heat exchange plate by a structural adhesive.

6. The battery pack according to claim 1, wherein the sinking platform is recessed downward from a side facing away from the upper support plate and protrudes towards the upper support plate, and the sinking platform is provided with a first hole running through the sinking platform in the height direction;

the upper support plate is provided with a second hole running through the upper support plate in the height direction, wherein the second hole is aligned with the first hole; and the battery pack further comprises a fastener that passes through the first hole of the sinking platform and the second hole of the upper support plate to fasten the heat exchange plate onto the upper support plate.

7. The battery pack according to claim 6, wherein the fastener does not protrude beyond an upper surface of the heat exchange plate.

* * * * *